(12) United States Patent
Wang (10) Patent No.: US 11,238,462 B2
(45) Date of Patent: *Feb. 1, 2022

(54) SUCCESS RATE OF AN ONLINE TRANSACTION

(71) Applicant: Advanced New Technologies Co., Ltd., Grand Cayman (KY)

(72) Inventor: Jun Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/340,218

(22) Filed: Jun. 7, 2021

(65) Prior Publication Data
US 2021/0295343 A1 Sep. 23, 2021

Related U.S. Application Data

(63) Continuation of application No. 15/802,264, filed on Nov. 2, 2017, now Pat. No. 11,030,628.

(30) Foreign Application Priority Data

Nov. 3, 2016 (CN) .......................... 201610954029.2

(51) Int. Cl.
*G06Q 40/00* (2012.01)
*G06Q 20/42* (2012.01)
(Continued)

(52) U.S. Cl.
CPC ......... *G06Q 20/42* (2013.01); *G06Q 20/3821* (2013.01); *G06Q 20/405* (2013.01)

(58) Field of Classification Search
None
See application file for complete search history.

(56) References Cited

U.S. PATENT DOCUMENTS 8,266,327 B2 9/2012 Kumar et al.
8,291,078 B2 10/2012 Luna et al.
(Continued)

FOREIGN PATENT DOCUMENTS

CN 101118628 2/2008
CN 101167100 4/2008
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Olabode Akintola
(74) *Attorney, Agent, or Firm* — Fish & Richardson P.C.

(57) ABSTRACT

A payment request is transmitted by a computing device to a merchant server. A message is received by the computing device and from a payment server different from the merchant server. The message includes a payment client application associated with the payment sever and the payment request. A notification, associated with the message, is displayed by the computing device. The payment client application is launched, by the computing device, based on a user selection in response to the notification.

24 Claims, 6 Drawing Sheets

(51) Int. Cl.
    *G06Q 20/40* (2012.01)
    *G06Q 20/38* (2012.01)

(56) References Cited

U.S. PATENT DOCUMENTS

| | | |
|---|---|---|
| 8,677,020 B2 | 3/2014 | Levkovitz et al. |
| 2004/0019564 A1 | 1/2004 | Goldwaite et al. |
| 2007/0011093 A1 | 1/2007 | Tree |
| 2007/0174490 A1 | 7/2007 | Choi et al. |
| 2007/0244811 A1 | 10/2007 | Tumminaro |
| 2010/0145861 A1 | 6/2010 | Law et al. |
| 2011/0217994 A1 | 9/2011 | Hirson et al. |
| 2012/0150750 A1 | 6/2012 | Law et al. |
| 2012/0158580 A1 | 6/2012 | Eram et al. |
| 2012/0173610 A1 | 7/2012 | Bleau et al. |
| 2012/0191569 A1* | 7/2012 | Shah .............. G06Q 20/405 705/26.41 |
| 2013/0085835 A1 | 4/2013 | Horowitz |
| 2014/0222676 A1 | 8/2014 | Lee et al. |
| 2014/0258367 A1* | 9/2014 | Suryavanshi ....... H04L 65/1073 709/203 |
| 2015/0294304 A1* | 10/2015 | Donnellan ......... G06Q 20/3276 705/44 |
| 2016/0239837 A1 | 8/2016 | Klingen et al. |

FOREIGN PATENT DOCUMENTS

| | | |
|---|---|---|
| CN | 102346890 | 2/2012 |
| CN | 103392186 | 11/2013 |
| JP | 2001325469 | 11/2001 |
| JP | 2013143153 | 7/2013 |
| JP | 2013539567 | 10/2013 |
| KR | 20110091265 | 8/2011 |
| KR | 20160116971 | 10/2016 |
| RU | 2520410 | 6/2014 |
| TW | M530439 | 10/2016 |
| WO | WO 2014101078 | 7/2014 |
| WO | WO 2015124776 | 8/2015 |
| WO | WO 2018118228 | 6/2018 |

OTHER PUBLICATIONS

Extended European Search Report in European Application No. 17882345.6, dated Sep. 16, 2019, 6 pages.
International Search Report and Written Opinion by the International Searching Authority issued in International Application No. PCT/US2017/59857 dated Jun. 21, 2018; 11 pages.
Nakamoto, "Bitcoin: A Peer-to-Peer Electronic Cash System," www.bitcoin.org, 2005, 9 pages.
PCT International Preliminary Report on Patentability Chapter II in International Application No. PCT/US2017/059857, dated Oct. 15, 2019, 16 pages.
Bbc.co.uk [online], "BBC News |0 UK | Phone firms defend security record," dated Oct. 28, 2021, retrieved on Dec. 9, 2021, retrieved from URL<https://web.archive.org/web/20021028134241/http://news.bbc.co.uk/2/hi/uk news/17 49215.stm >, 4 pages.
Github.com [online], "GitHub—Smile-SA/node-pushserver: Cross-platform push notifications server," dated Jun. 26, 2016, retrieved Dec. 10, 2021, retrieved from URL<https7/github.com/Smile-SA/node-pushserver>, 8 pages.
Li et al., "Mayhem in the Push Clouds," ACM, Nov. 3, 2014, 12 pages.
Youtube.com [online], "Google 1/0 2014—Achieving more with Mobile Cloud," dated Jun. 25, 2014, retrieved from URL<https://www.youtube.com/watch? v=aJNzuxhZSxQ&list=PLOU2XLYxmsl-liaVcbQ9_rbl9lzF2agybt&ind ex=5>, 2 pages.

\* cited by examiner

SUCCESS RATE OF AN ONLINE TRANSACTION

CROSS REFERENCE TO RELATED APPLICATIONS

This application is a continuation of U.S. patent application Ser. No. 15/802,264, filed on Nov. 2, 2017, which claims priority to Chinese Application No. 201610954029.2, filed on Nov. 3, 2016, which is incorporated by reference is its entirety.

BACKGROUND

When a browser is used to perform an online transaction with a server, the server has to interact with the browser in order to complete the online transaction. If the browser and the server are developed by different developers, the success rate of the online transaction can be low due to poor interactivity and poor compatibility between the browser and the server.

SUMMARY

The present disclosure describes improving the success rate of an online transaction.

In an implementation, a payment request is transmitted by a computing device to a merchant server. A message is received by the computing device and from a payment server different from the merchant server. The message includes a payment client application associated with the payment sever and the payment request. A notification, associated with the message, is displayed by the computing device. The payment client application is launched, by the computing device, based on a user selection in response to the notification.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the described approach can be used to improve a success rate for online transactions. For example, when a user uses a browser (such as GOOGLE CHROME or APPLE SAFARI) on a mobile device to perform an online transaction (such as, a payment) with a server (such as an ALIPAY server), the server can determine that a client application associated with the server (such as, an ALIPAY client application) exists on the mobile device. The server can then send a message to the mobile device, notifying the user that the client application on the mobile device can be used to complete the online transaction. Instead of using the browser, which may have poor interactivity and poor compatibility with the server if developed by different developers, the user can then use the client application associated with the server to complete the online transaction. Since the server and the client application associated with the server are developed by a same developer, the success rate of the online transaction can be improved. Second, while using the browser, the user can be automatically notified to instead use the client application associated with the server to perform the online transaction. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

The following detailed description describes performing an online transaction and, particularly, improving the success rate of the online transaction. The detailed description is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined herein can be applied to other implementations and applications, without departing from the scope of the present disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

When a user uses a browser on a mobile device to perform an online transaction with a server, the server can interact with the browser in order to complete the online transaction. For example, the user browses a merchant website, places an order, and wants to pay using ALIPAY, a third-party mobile and online payment platform. The browser on the mobile device can load a web page of ALIPAY. Then, the user can make a payment on the web page of ALIPAY loaded by the browser. In this way, the payment is completed through interactions between the browser and an ALIPAY server. Since the browser and the ALIPAY server are developed by different developers, the success rate of the payment can be low due to poor interactivity and poor compatibility between the browser and the ALIPAY server. Payment failure can hurt user experience with both the merchant website and ALIPAY.

At a high-level, the described approach permits automatic determination of a client application associated with a server on a mobile device, sending a message to the mobile device to notify a user that the client application on the mobile device can be used to complete the online transaction. Based on the message, the user can launch the client application on the mobile device to complete the online transaction instead of using the browser. For example, the merchant website transmits data, including identity information associated with the mobile device, to the ALIPAY server after receiving the order from the user. The ALIPAY server determines that an ALIPAY client application exists on the mobile device based on the identity information associated with the mobile device. The ALIPAY server transmits a message to the mobile device notifying the user that the ALIPAY client application on the mobile device can be used to make the payment. Instead of using the browser, the user can switch to the ALIPAY client application on the mobile device to complete the payment.

Figure 1:
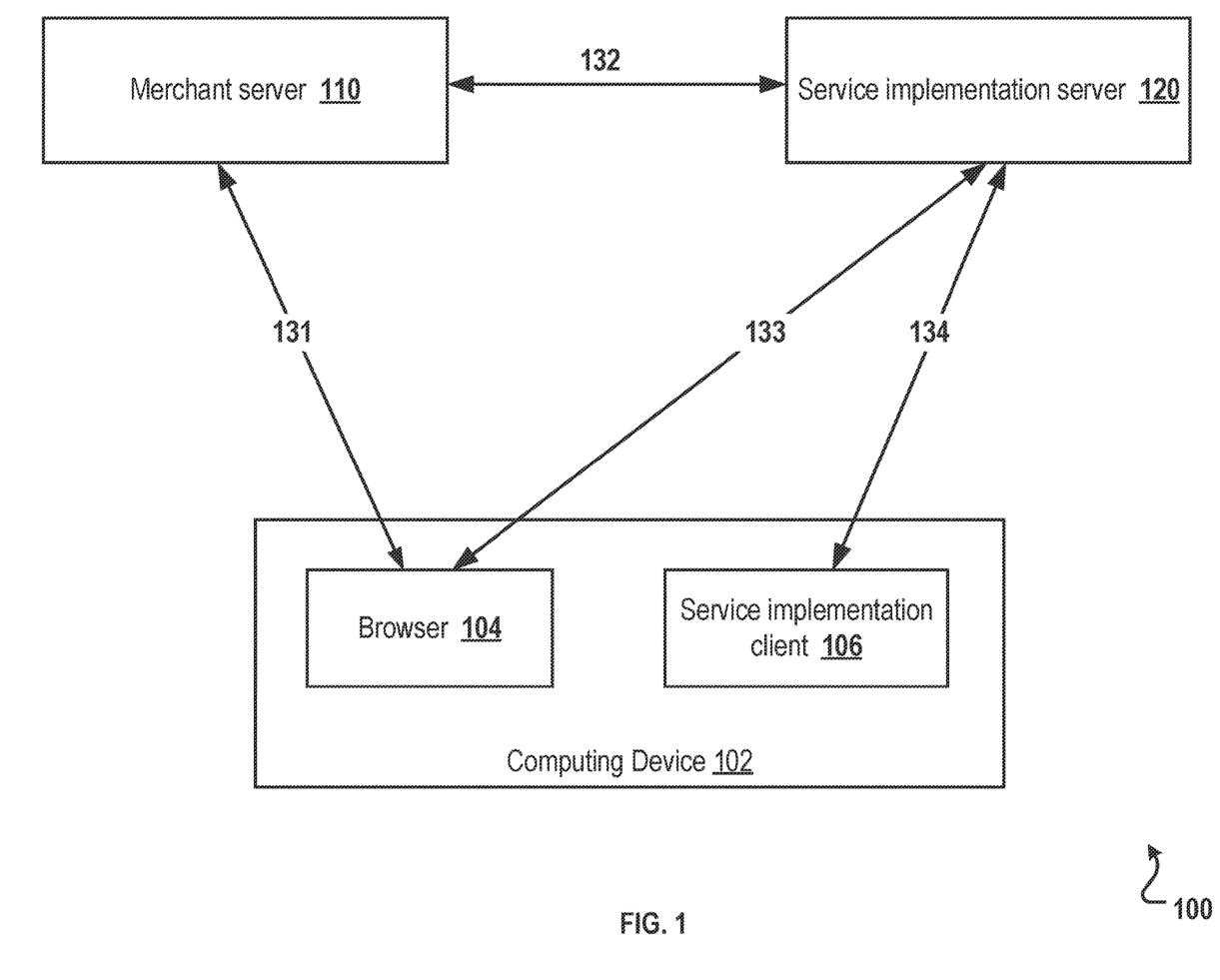
FIG. 1 is a block diagram illustrating an example of a networking environment for performing an online transaction, according to an implementation of the present disclosure.

FIG. 1 is a block diagram illustrating an example of a networking environment 100 for performing an online transaction, according to an implementation of the present disclosure. The online transaction includes an online payment transaction. As illustrated in FIG. 1, the environment 100 includes a computing device 102, a merchant server 110, and a service implementation server 120. The computing device 102 includes a browser 104 and a service implementation client 106. The browser 104 can communicate with the merchant server 110 using link 131 and communicate with the service implementation server 120 using link 133. The merchant server 110 can communicate with the service implementation server 120 using link 132. The service implementation client 106 can communicate with the service implementation server 120 using link 134. In some implementations, the environment 100 may include additional or different components not shown in the block diagram, such as one or more computing devices, another type of sever, or a combination of both. In some implementations, components may also be omitted from the environment 100.

In some implementations, the computing device 102 can be a mobile phone, a tablet computer, or any type of computing device consistent with the present disclosure. An operating system of the computing device 102 can include ANDROID, WINDOWS, IOS, or any other operating system consistent with this disclosure. The computing device 102 can be installed with the browser 104 and the service implementation client 106 (for example, a payment client application). In some implementations, the browser 104 can be an independent browser. In some implementations, the browser 104 can be a built-in browser (such as, GOOGLE CHROME or APPLE SAFARI). The merchant server 110 can be a server of a merchant website (such as, MEITUAN, TAOBAO, and TMALL). The service implementation server 120 can be a payment server (such as an ALIPAY server) or any type of server consistent with the present disclosure. The service implementation server 120 and the service implementation client 106 can form a service implementation system. When the service implementation client 106 on the computing device 102 is online, including online at the front end and online at the back end, the service implementation server 120 can establish a connection for a long period of time with the service implementation client 106. Once the connection is established, the service implementation server 120 can push a notification message directly to the service implementation client 106. When the service implementation client 106 on the computing device 102 is offline, the service implementation server 120 can send a notification message to a message push system (such as, APPLE's push system) of the computing device 102. The message push system then can push the notification message to the service implementation client 106 on the computing device 102.

A user of the computing device 102 can interact with the merchant server 110 and the service implementation server 120 using the browser 104. For example, while browsing a web page of the merchant server 110, the user can send a data generation request or a service request to the merchant server 110 using the browser. As a result, the merchant server 110 can execute the request by calling the service implementation server 120. The service implementation server 120 interacts with the browser 104 to complete the request. The user of the computing device 102 can also interact with the service implementation server 120 using the service implementation client 106.

Figure 2:
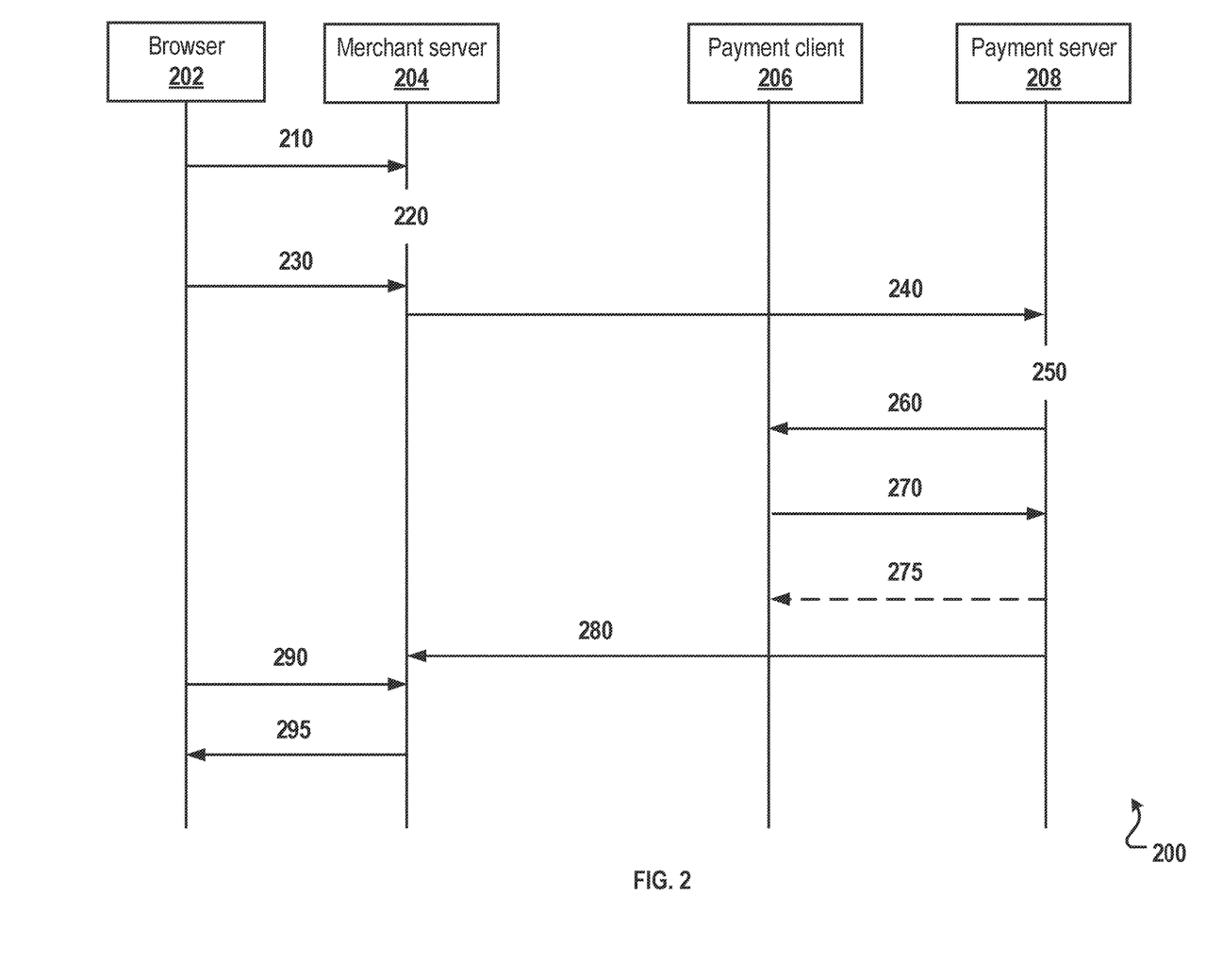
FIG. 2 is a swim diagram illustrating an example of a method for performing an online transaction, according to an implementation of the present disclosure.

FIG. 2 is a swim diagram illustrating an example of a method 200 for performing an online transaction, according to an implementation of the present disclosure. In general, when a user makes a purchase on a merchant server 204 using a browser 202, the user can use a payment method of the user's choice. If the payment method is provided by a third-party payment server 208, the third-party payment server 208 also participates in the payment transaction.

At 210, a user places an order on the merchant server 204 using the browser 202. The browser 202 is installed on a computing device used by the user to place the order. A web page of the merchant server 204 is loaded by the browser 202. The order can be placed using the browser 202 after the user browsed the web page of the merchant server 204 loaded by the browser 202 and selected one or more commodities. From 210, method 200 proceeds to 220.

At 220, the merchant server 204 generates data associated with the order. The data associated with the order includes identity information associated with the computing device. In some implementations, the data associated with the order includes at least one of an order number, the selected one or more commodities, and a gross amount of the selected one or more commodities. The identity information associated with the computing device includes identification information of the user using the computing device. In some implementations, the merchant server 204 can display the data to the user using the browser 202. From 220, method 200 proceeds to 230.

At 230, the user sends a payment request for the placed order to the merchant server 204 using the browser 202. In some implementations, the merchant server 204 determines that the payment is supported by the payment server 208. From 230, method 200 proceeds to 240.

At 240, the merchant server 204 transmits the data associated with the order to the payment server 208. From 240, method 200 proceeds to 250.

At 250, the payment server 208 determines a payment client 206 associated with the payment server 208 based on the data associated with the order. In some implementations, both the payment client 206 and the payment server 208 are developed by a same developer. The payment client 206 is installed on the computing device used by the user to place the order. There is a connection established between the payment client 206 and the payment server 208. From 250, method 200 proceeds to 260.

At 260, the payment server 208 pushes a notification message to the payment client 206. In some implementations, the notification message is pushed using the connection established between the payment client 206 and the payment server 208. In some implementations, the notification message indicates that the payment client 206 can be used for completing the payment. From 260, method 200 proceeds to 270.

At 270, the user launches the payment client 206 on the computing device. In some implementations, the user clicks the notification message to launch the payment client 206. The user then makes the payment using the payment client 206 instead of the browser 202. From 270, method 200 proceeds to 280.

At 280, the payment server 208 sends an execution result of the payment to the merchant server 204. In some implementations, there is an optional step 275 between 270 and 280. At 275, the payment server 208 sends the execution result of the payment to the payment client 206. From 280, method 200 proceeds to 290.

At 290, the user queries the merchant server 204 for the execution result of the payment using the browser 202. In some implementations, step 290 can be performed in any step after 230. From 290, method 200 proceeds to 295.

At 295, the merchant server 204 returns the execution result of the payment to the user using the browser 202. After 295, method 200 stops.

Figure 3:
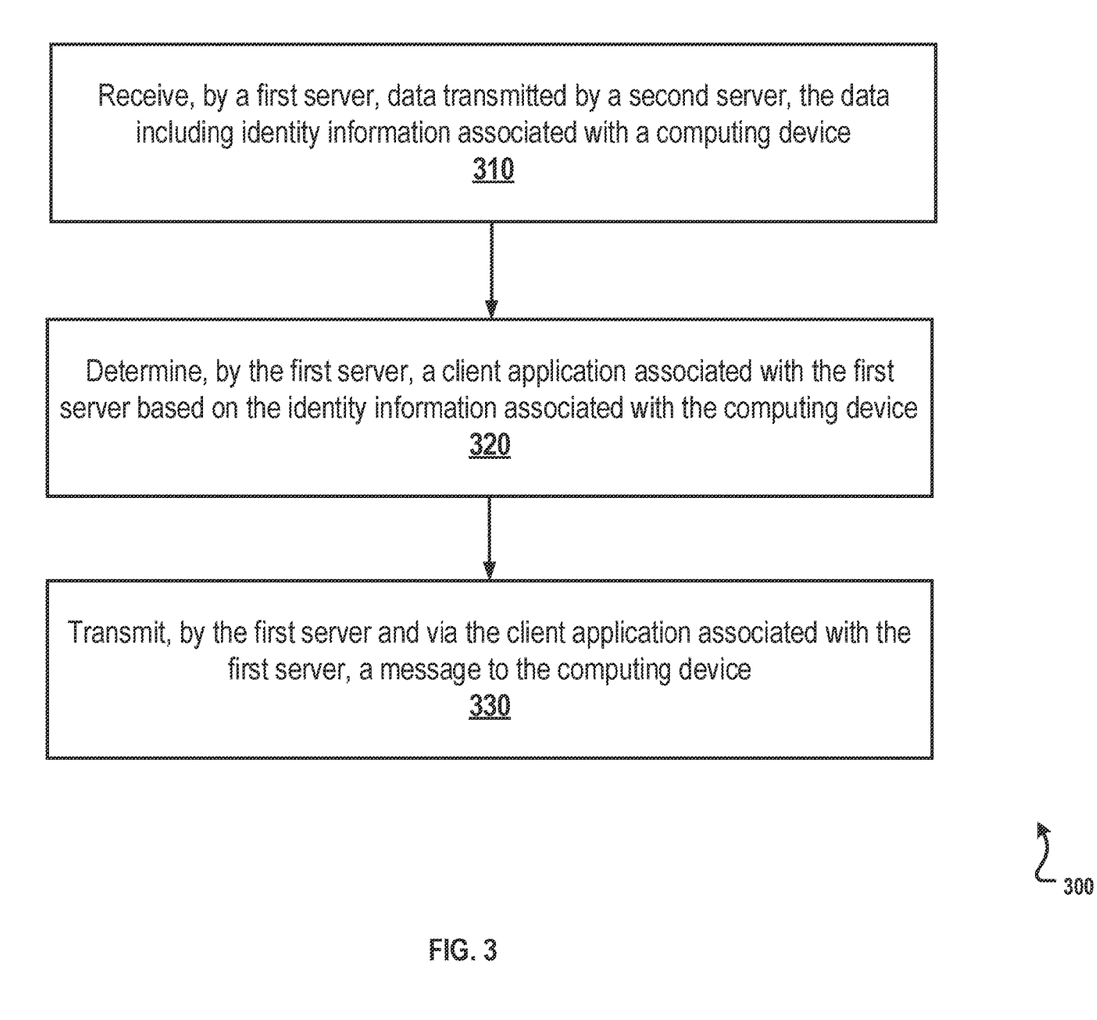
FIG. 3 is a flowchart illustrating an example of a method for performing an online transaction, according to an implementation of the present disclosure.

FIG. 3 is a flowchart illustrating an example of a method 300 for performing an online transaction, according to an implementation of the present disclosure. For clarity of presentation, the description that follows generally describes method 300 in the context of the other figures in this description. However, it will be understood that method 300 can be performed, for example, by any suitable system, environment, software, and hardware, or a combination of systems, environments, software, and hardware, as appropriate. In some implementations, various steps of method 300 can be run in parallel, in combination, in loops, or in any order. In some implementations, the method 300 can include additional or different (or a combination of both) steps not shown in the flowchart. In some implementations, various steps of method 300 can also be omitted from the method 300.

At 310, a first server receives data transmitted by a second server. The data is transmitted by the second server to the first server after the second server receives a service request from a computing device using a browser. The service request can be a payment request. The data includes identity information associated with the computing device. For example, identity information associated with the computing device can be identification information of a user using the computing device (that is, user_id). In some implementations, the first server is a service implementation server (such as a payment server). The second server is a server of a merchant website (such as, MEITUAN, TAOBAO, and TMALL). The merchant website provides a portal of a service implementation system. The user can select, using the portal, whether or not to implement the service using the service implementation system. From 310, method 300 proceeds to 320.

At 320, a client application associated with the first server is determined by the first server. When the first server is a service implementation server, the client application associated with the first server is a service implementation client associated with the service implementation server. In some implementations, the first server is a payment server, the second server is a merchant server, the client application associated with the first server is a payment client associated with the payment server, and the service request is a payment request. In some implementations, the client application is determined based on the identity information associated with the computing device (such as user_id) by querying a relationship list. The relationship list can be a table or other data structure that can store computing device identity information (such as user_id), client identity information (such as client id), and relationships between the computing device identity information and the client identity information. For example, when a user logs into a client application on a computing device, the first server can store the identification information of the user using the computing device (such as user_id), the identity information of the client application on the computing device (such as client id), and the relationship between the identification information of the user using the computing device and the identity information of the client application on the computing device. In some implementations, the identity information of the client application on the computing device is generated by the first service. For example, after a user logs into a client application on a computing device, the first server acquires identity information of the computing device (such as an International Mobile Equipment Identification Number (IMEI)). Then, the first server randomly generates, for example, n-bit (n being a natural number) identification information to identify the client application on the computing device. The identity information of the client application on the computing device is generated based on the acquired identity information of the computing device and the randomly generated n-bit identification information. In some implementations, the relationship list can be queried using a Structured Query Language (SQL) query. Table 1 shows an example relationship list.

TABLE 1

| user_id | client_id |
|---|---|
| aaa12312 | 354971074421111_0000 |
| bbbb1214 | 354971074422222_0001 |
| ... | ... |

In Table 1, user_id uniquely identifies a user using a computing device and client id uniquely identifies a client application on a computing device. For client id in Table 1, a character string (such as an IMEI) before "_" identifies a computing device, and a character string (such as a randomly generated n-bit identification information) after "_" identifies a client application on the particular computing device. In some implementations, the number of digits of client id can be different than 20 as in Table 1. In some implementations, client id can be generated in a different way than those in Table 1.

In some implementations, determining a client application includes identifying identity information of the client application on the computing device (such as client id) based on the identity information associated with the computing device (such as user_id), and identifying identity information of the computing device based on the identity information of the client application on the computing device. For example, when the received identification information of a user using a computing device is "aaa12312," the identity information of a client application on the computing device is determined to be "354971074421111_0000" based on the relationship list in Table 1. In addition, identity information of the computing device is determined to be "354971074421111." From 320, method 300 proceeds to 330.

At 330, a message is transmitted, by the first server and using the client application associated with the first server, to the computing device. In some implementations, when the client application, associated with the first server, on the computing device is online, a connection for a long period of time can be established between the first server and the client application before step 310. The first server can identify the identity information of the computing device and the identity information of the client application on the computing device directly. The first server can then send a notification message to the user using the client application. In some implementations, the client application, associated with the first server, on the computing device is offline. The first server can send an instruction message to a message push system (such as a push system of Apple). The instruction message includes client identity information. The message push system can identify identity information of the computing device and identity information of the client application on the computing device based on the instruction message. The message push system then can send a notification message to the user using the client application. After 330, method 300 stops.

Figure 4:
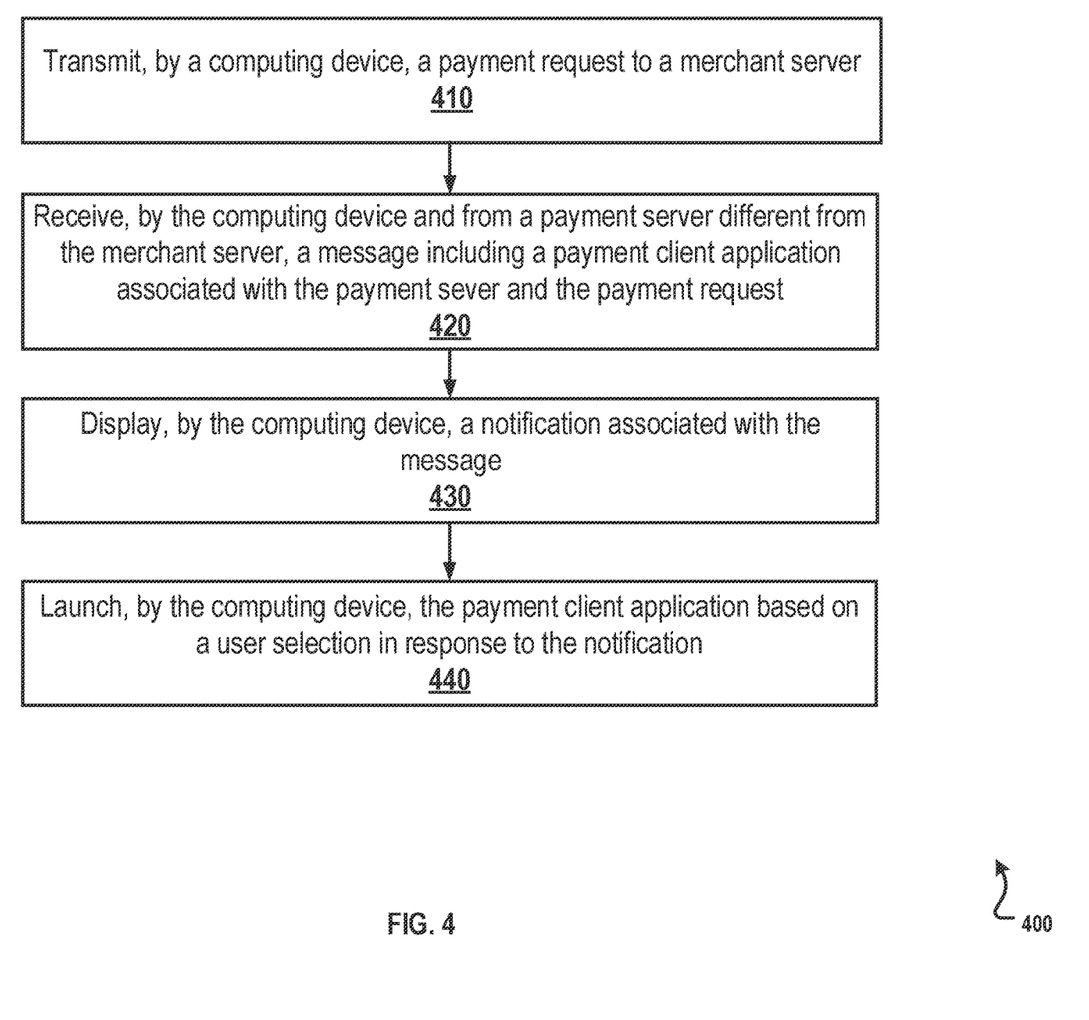
FIG. 4 is a flowchart illustrating another example of a method for performing an online transaction, according to an implementation of the present disclosure.

FIG. 4 is a flowchart illustrating another example of a method 400 for performing an online transaction, according to an implementation of the present disclosure. For clarity of presentation, the description that follows generally describes method 400 in the context of the other figures in this description. However, it will be understood that method 400 can be performed, for example, by any suitable system, environment, software, and hardware, or a combination of systems, environments, software, and hardware, as appropriate. In some implementations, various steps of method 400 can be run in parallel, in combination, in loops, or in any order. In some implementations, the method 400 can include additional or different (or a combination of both) steps not shown in the flowchart. In some implementations, various steps of method 400 can also be omitted from the method 400.

At 410, a payment request is transmitted to a merchant server by a computing device. The payment request is transmitted using a browser installed on the computing device. The merchant server can generate data associated with an order based on the payment request. The data associated with the order includes identity information associated with the computing device. The merchant server can send the data associated with the order to a payment server different from the merchant server. From 410, method 400 proceeds to 420.

At 420, a message is received, by the computing device and from the payment server. The message includes a payment client application associated with the payment sever and the payment request. In some implementations, the payment client application is installed on the computing device. In some implementations, the payment client application is connected with the payment server. In some implementations, the payment client application can be determined by querying a relationship list, as discussed in step 320 of FIG. 3. From 420, method 400 proceeds to 430.

At 430, a notification associated with the message is displayed by the computing device. In some implementations, the notification is displayed using the payment client application on the computing device. The notification notifies a user to use the payment client application instead of the browser to make a payment with the payment server. From 430, method 400 proceeds to 440.

At 440, the payment client application is launched, by the computing device, based on a user selection in response to the displayed notification. In some implementations, the user can switch application from the browser to the payment client application on the computing device by clicking on the displayed notification. In some implementations, if the payment client application is not installed on the computing device, the user can download the payment client application on the computing device before launching the payment client application on the computing device. In some implementations, after the payment client application is launched, a payment associated with the payment request is made using the payment client application. After 440, method 400 stops.

Figure 5:
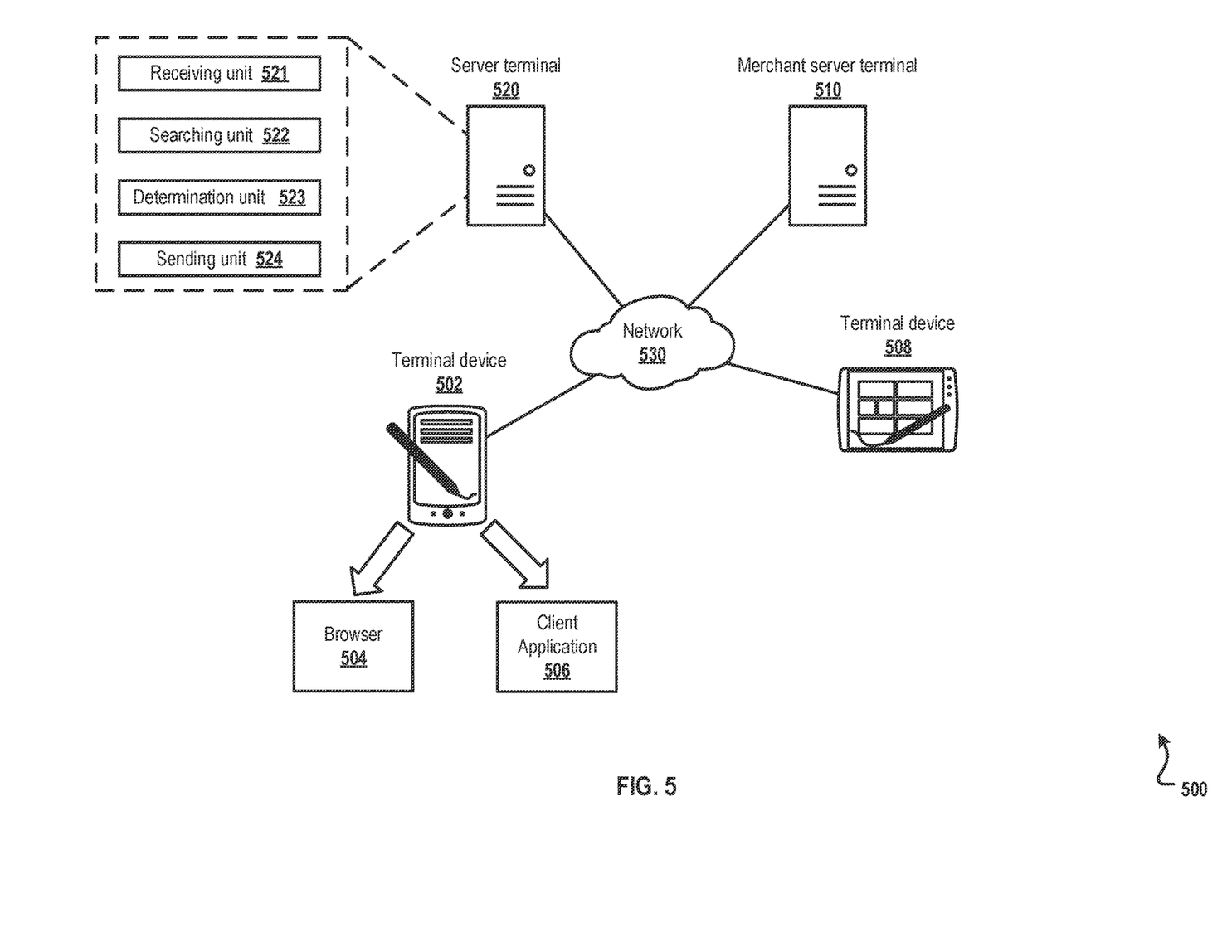
FIG. 5 is a block diagram illustrating an example of a computing-based architecture for performing an online transaction, according to an implementation of the present disclosure.

FIG. 5 is a block diagram illustrating an example of a computing-based architecture 500 for performing an online transaction, according to an implementation of the present disclosure. For clarity of presentation, the description that follows generally describes architecture 500 in the context of the other figures in this description. As illustrated in FIG. 5, terminal devices 502 and 508 are connected, using network 530, with a server terminal 520 and a Merchant server terminal 510. The terminal device 502 includes a browser 504 and a client application 506. The server terminal includes a receiving unit 521, a searching unit 522, a determination unit 523, and a sending unit 524. In some implementations, the server terminal can include an establishment unit.

The receiving unit 521 can receive data transmitted by Merchant server terminal 510, as discussed in step 310 of FIG. 3. The searching unit 522 can identify client identity information based on identity information associated with a computing device included in the received data, as discussed in step 320 of FIG. 3. The determination unit 523 can determine a client application associated with the server terminal 520 based on the identified client identity information, as discussed in step 320 of FIG. 3. The sending unit 524 can transmit a message, using the client application associated with the server terminal 520, to the computing device, as discussed in step 330 of FIG. 3. The establishment unit can establish a connection with the client application associated with the server terminal 520.

Figure 6:
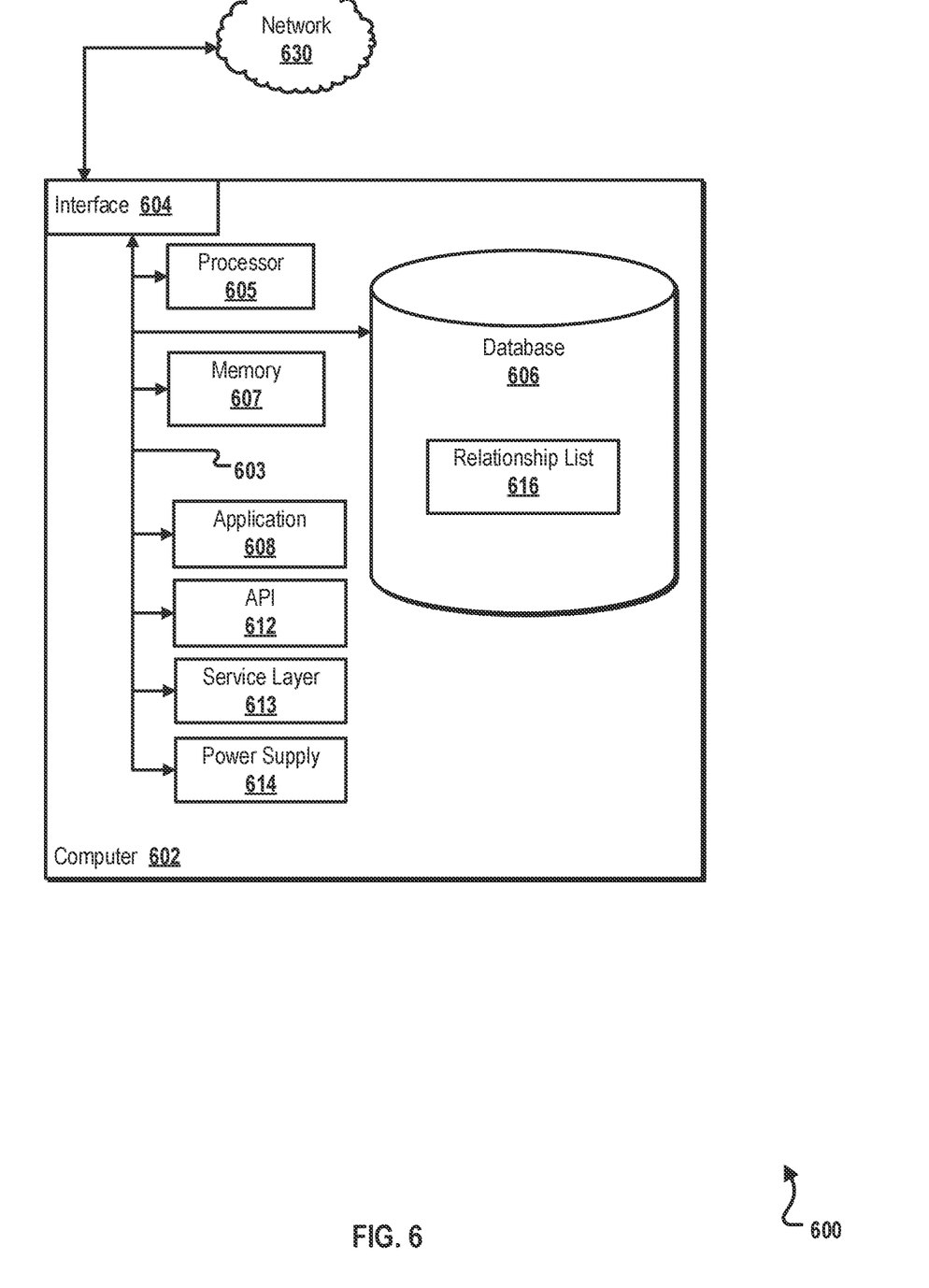
FIG. 6 is a block diagram illustrating an example of a computer system used to provide computational functionalities associated with described algorithms, methods, functions, processes, flows, and procedures, according to an implementation of the present disclosure.

FIG. 6 is a block diagram illustrating an example of a computer system 600 used to provide computational functionalities associated with described algorithms, methods, functions, processes, flows, and procedures, according to an implementation of the present disclosure.

The illustrated computer 602 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the computer 602 can comprise a computer that includes an input device, such as a keypad, keyboard, touch screen, another input device, or a combination of input devices that can accept user information, and an output device that conveys information associated with the operation of the computer 602, including digital data, visual, audio, another type of information, or a combination of types of information, on a graphical-type user interface (UI) (or GUI) or other UI.

The computer 602 can serve in a role in a computer system as a client, network component, a server, a database or another persistency, another role, or a combination of roles for performing the subject matter described in the present disclosure. The illustrated computer 602 is communicably coupled with a network 630. In some implementations, one or more components of the computer 602 can be configured to operate within an environment, including cloud-computing-based, local, global, another environment, or a combination of environments.

At a high level, the computer 602 is an electronic computing device operable to receive, transmit, process, store, or manage data and information associated with the described subject matter. According to some implementations, the computer 602 can also include or be communicably coupled with a server, including an application server, e-mail server, web server, caching server, streaming data server, another server, or a combination of servers.

The computer 602 can receive requests over network 630 (for example, from a client software application executing on another computer 602) and respond to the received requests by processing the received requests using a software application or a combination of software applications. In addition, requests can also be sent to the computer 602 from internal users (for example, from a command console or by another internal access method), external or third-parties, or other entities, individuals, systems, or computers.

Each of the components of the computer 602 can communicate using a system bus 603. In some implementations, any or all of the components of the computer 602, including hardware, software, or a combination of hardware and software, can interface over the system bus 603 using an application programming interface (API) 612, a service layer 613, or a combination of the API 612 and service layer 613. The API 612 can include specifications for routines, data structures, and object classes. The API 612 can be either computer-language independent or dependent and refer to a complete interface, a single function, or even a set of APIs. The service layer 613 provides software services to the computer 602 or other components (whether illustrated or not) that are communicably coupled to the computer 602. The functionality of the computer 602 can be accessible for all service consumers using this service layer. Software services, such as those provided by the service layer 613, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 602, alternative implementations can illustrate the API 612 or the service layer 613 as stand-alone components in relation to other components of the computer 602 or other components (whether illustrated or not) that are communicably coupled to the computer 602. Moreover, any or all parts of the API 612 or the service layer 613 can be implemented as a child or a sub-module of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602. The interface 604 is used by the computer 602 for communicating with another computing system (whether illustrated or not) that is communicatively linked to the network 630 in a distributed environment. Generally, the interface 604 is operable to communicate with the network 630 and comprises logic encoded in software, hardware, or a combination of software and hardware. More specifically, the interface 604 can comprise software supporting one or more communication protocols associated with communications such that the network 630 or interface's hardware is operable to communicate physical signals within and outside of the illustrated computer 602.

The computer 602 includes a processor 605. Although illustrated as a single processor 605 in FIG. 6, two or more processors can be used according to particular needs, desires, or particular implementations of the computer 602. Generally, the processor 605 executes instructions and manipulates data to perform the operations of the computer 602 and any algorithms, methods, functions, processes, flows, and procedures as described in the present disclosure.

The computer 602 also includes a database 606 that can hold data for the computer 602, another component communicatively linked to the network 630 (whether illustrated or not), or a combination of the computer 602 and another component. For example, database 606 can be an in-memory, conventional, or another type of database storing data consistent with the present disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases of similar or differing types can be used according to particular needs, desires, or particular implementations of the computer 602 and the described functionality. While database 606 is illustrated as an integral component of the computer 602, in alternative implementations, database 606 can be external to the computer 602. As illustrated, the database 606 can hold previously described relationship list 616.

The computer 602 also includes a memory 607 that can hold data for the computer 602, another component or components communicatively linked to the network 630 (whether illustrated or not), or a combination of the computer 602 and another component. Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 or similar or differing types can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in the present disclosure. For example, application 608 can serve as one or more components, modules, or applications. Further, although illustrated as a single application 608, the application 608 can be implemented as multiple applications 608 on the computer 602. In addition, although illustrated as integral to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion or management circuits (including recharging, standby, or another power management functionality). In some implementations, the power-supply 614 can include a power plug to allow the computer 602 to be plugged into a wall socket or another power source to, for example, power the computer 602 or recharge a rechargeable battery.

There can be any number of computers 602 associated with, or external to, a computer system containing computer 602, each computer 602 communicating over network 630. Further, the term "client," "user," or other appropriate terminology can be used interchangeably, as appropriate, without departing from the scope of the present disclosure. Moreover, the present disclosure contemplates that many users can use one computer 602, or that one user can use multiple computers 602.

Described implementations of the subject matter can include one or more features, alone or in combination.

For example, in a first implementation, a computer-implemented method, comprising: receiving, by a first server, data transmitted by a second server, wherein the data includes identity information associated with a computing device; determining, by the first server, a client application associated with the first server based on the identity information associated with the computing device; and transmitting, by the first server and using the client application associated with the first server, a message to the computing device.

The foregoing and other described implementations can each, optionally, include one or more of the following features:

A first feature, combinable with any of the following features, wherein the data is transmitted by the second server to the first server after the second server receives a service request from the computing device using a browser.

A second feature, combinable with any of the previous or following features, wherein the browser and the client application associated with the first server are both installed on the computing device.

A third feature, combinable with any of the previous or following features, further comprising establishing, by the first server, a connection with the client application associated with the first server before receiving the data.

A fourth feature, combinable with any of the previous or following features, wherein the first server is a service implementation server, the second server is a merchant server, and the client application associated with the first server is a service implementation client associated with the service implementation server.

A fifth feature, combinable with any of the previous or following features, wherein the first server is a payment server, the second server is a merchant server, the client application associated with the first server is a payment client associated with the payment server, and the service request is a payment request.

A sixth feature, combinable with any of the previous or following features, wherein determining the client application associated with the first server comprises: identifying client identity information based on the identity information associated with the computing device; and determining the client application associated with the first server based on the identified client identity information.

A seventh feature, combinable with any of the previous or following features, wherein transmitting the message to the computing device comprises: transmitting, by the first server and to the client application associated with the first server, the message; and transmitting, by the client application associated with the first server and to the computing device, the message.

In a second implementation, a computer-implemented method, comprising: transmitting, by a computing device, a payment request to a merchant server; receiving, by the computing device and from a payment server different from the merchant server, a message, wherein the message includes a payment client application associated with the payment sever and the payment request; displaying, by the computing device, a notification associated with the message; and launching, by the computing device, the payment client application based on a user selection in response to the notification.

The foregoing and other described implementations can each, optionally, include one or more of the following features:

A first feature, combinable with any of the following features, wherein the payment request is transmitted using a browser installed on the computing device.

A second feature, combinable with any of the previous or following features, wherein the payment client application is installed on the computing device.

A third feature, combinable with any of the previous or following features, wherein the payment client application is connected with the payment server.

A fourth feature, combinable with any of the previous or following features, further comprising making a payment associated with the payment request using the payment client application.

In a third implementation, a non-transitory, computer-readable medium storing one or more instructions executable by a computer system to perform operations comprising: transmitting a payment request to a merchant server; receiving, from a payment server different from the merchant server, a message, wherein the message includes a payment client application associated with the payment sever and the payment request; displaying a notification associated with the message; and launching the payment client application based on a user selection in response to the notification.

The foregoing and other described implementations can each, optionally, include one or more of the following features:

A first feature, combinable with any of the following features, wherein the payment request is transmitted using a browser installed on the computing system.

A second feature, combinable with any of the previous or following features, wherein the payment client application is installed on the computing system.

A third feature, combinable with any of the previous or following features, wherein the payment client application is connected with the payment server.

A fourth feature, combinable with any of the previous or following features, the operations further comprising making a payment associated with the payment request using the payment client application.

In a fourth implementation, a computer-implemented system, comprising: one or more computers; and one or more computer memory devices interoperably coupled with the one or more computers and having tangible, non-transitory, machine-readable media storing instructions that, when executed by the one or more computers, perform operations comprising: transmitting a payment request to a merchant server; receiving, from a payment server different from the merchant server, a message, wherein the message includes a payment client application associated with the payment sever and the payment request; displaying a notification associated with the message; and launching the payment client application based on a user selection in response to the notification.

A first feature, combinable with any of the following features, wherein the payment request is transmitted using a browser installed on the one or more computers.

A second feature, combinable with any of the previous or following features, wherein the payment client application is installed on the one or more computers.

A third feature, combinable with any of the previous or following features, wherein the payment client application is connected with the payment server.

A fourth feature, combinable with any of the previous or following features, the operations further comprising making a payment associated with the payment request using the payment client application.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    transmitting, by a computing device, a payment request to a merchant server using a browser installed on the computing device;
    receiving, by the computing device and from a payment server, a message, wherein the payment server is different than the merchant server, wherein the message includes a payment client application associated with the payment sever and the payment request, wherein the payment server determines the payment client application by querying a relationship list based on a user ID associated with the computing device received from the merchant server, wherein the relationship list comprises a relationship between the user ID and a client ID that identifies the payment client application on the computing device, and wherein the client ID comprises identity information of the computing device and a random number;
    displaying, by the computing device, a notification associated with the message, wherein the notification notifies a user of the computing device to use the payment client application instead of the browser to complete the payment request with the payment server; and
    launching, by the computing device, the payment client application based on a user selection in response to the notification.

2. The computer-implemented method of claim 1, wherein the payment client application is installed on the computing device.

3. The computer-implemented method of claim 1, wherein the client ID further comprises a character that separates the identity information of the computing device and the random number.

4. The computer-implemented method of claim 1, further comprising making a payment associated with the payment request using the payment client application.

5. The computer-implemented method of claim 1, wherein the identity information of the computing device and the user ID are obtained by the payment server when the payment client application is logged into by the user.

6. The computer-implemented method of claim 1, wherein the message comprises the client ID.

7. The computer-implemented method of claim 6, comprising:
    in response to determining that the payment client application is offline, receiving, by a message push system of the computing device and from the payment server, the message;
    identifying, by the message push system of the computing device and based on the client ID, the payment client application; and
    sending, by the message push system of the computing device, the message to the payment client application.

8. The computer-implemented method of claim 6, comprising:
    in response to determining that the payment client application is online, establishing a connection between the payment server and the payment client application; and
    receiving, by the payment client application and using the connection, the message.

9. A non-transitory, computer-readable medium storing one or more instructions executable by a computer system to perform operations comprising:
    transmitting, by a computing device, a payment request to a merchant server using a browser installed on the computing device;
    receiving, by the computing device and from a payment server, a message, wherein the payment server is different than the merchant server, wherein the message includes a payment client application associated with the payment sever and the payment request, wherein the payment server determines the payment client application by querying a relationship list based on a user ID associated with the computing device received from the merchant server, wherein the relationship list comprises a relationship between the user ID and a client ID that identifies the payment client application on the computing device, and wherein the client ID comprises identity information of the computing device and a random number;
    displaying, by the computing device, a notification associated with the message, wherein the notification notifies a user of the computing device to use the payment client application instead of the browser to complete the payment request with the payment server; and
    launching, by the computing device, the payment client application based on a user selection in response to the notification.

10. The non-transitory, computer-readable medium of claim 9, wherein the payment client application is installed on the computing device.

11. The non-transitory, computer-readable medium of claim 9, wherein the client ID further comprises a character that separates the identity information of the computing device and the random number.

12. The non-transitory, computer-readable medium of claim 9, further comprising making a payment associated with the payment request using the payment client application.

13. The non-transitory, computer-readable medium of claim 9, wherein the identity information of the computing device and the user ID are obtained by the payment server when the payment client application is logged into by the user.

14. The non-transitory, computer-readable medium of claim 9, wherein the message comprises the client ID.

15. The non-transitory, computer-readable medium of claim 14, comprising:
in response to determining that the payment client application is offline, receiving, by a message push system of the computing device and from the payment server, the message;
identifying, by the message push system of the computing device and based on the client ID, the payment client application; and
sending, by the message push system of the computing device, the message to the payment client application.

16. The non-transitory, computer-readable medium of claim 14, comprising:
in response to determining that the payment client application is online, establishing a connection between the payment server and the payment client application; and
receiving, by the payment client application and using the connection, the message.

17. A computer-implemented system, comprising:
one or more computers; and
one or more computer memory devices interoperably coupled with the one or more computers and having tangible, non-transitory, machine-readable media storing one or more instructions that, when executed by the one or more computers, cause the one or more computers to perform one or more operations comprising:
transmitting, by a computing device, a payment request to a merchant server using a browser installed on the computing device;
receiving, by the computing device and from a payment server, a message, wherein the payment server is different than the merchant server, wherein the message includes a payment client application associated with the payment sever and the payment request, wherein the payment server determines the payment client application by querying a relationship list based on a user ID associated with the computing device received from the merchant server, wherein the relationship list comprises a relationship between the user ID and a client ID that identifies the payment client application on the computing device, and wherein the client ID comprises identity information of the computing device and a random number;
displaying, by the computing device, a notification associated with the message, wherein the notification notifies a user of the computing device to use the payment client application instead of the browser to complete the payment request with the payment server; and
launching, by the computing device, the payment client application based on a user selection in response to the notification.

18. The computer-implemented system of claim 17, wherein the payment client application is installed on the computing device.

19. The computer-implemented system of claim 17, wherein the client ID further comprises a character that separates the identity information of the computing device and the random number.

20. The computer-implemented system of claim 17, further comprising making a payment associated with the payment request using the payment client application.

21. The computer-implemented system of claim 17, wherein the identity information of the computing device and the user ID are obtained by the payment server when the payment client application is logged into by the user.

22. The computer-implemented system of claim 17, wherein the message comprises the client ID.

23. The computer-implemented system of claim 22, comprising:
in response to determining that the payment client application is offline, receiving, by a message push system of the computing device and from the payment server, the message;
identifying, by the message push system of the computing device and based on the client ID, the payment client application; and
sending, by the message push system of the computing device, the message to the payment client application.

24. The computer-implemented system of claim 22, comprising:
in response to determining that the payment client application is online, establishing a connection between the payment server and the payment client application; and
receiving, by the payment client application and using the connection, the message.

* * * * *

UNITED STATES PATENT AND TRADEMARK OFFICE
CERTIFICATE OF CORRECTION

PATENT NO. : 11,238,462 B2
APPLICATION NO. : 17/340218
DATED : February 1, 2022
INVENTOR(S) : Wang It is certified that error appears in the above-identified patent and that said Letters Patent is hereby corrected as shown below:

On the Title Page

Column 2 item (57) (Abstract), Line 5, delete "sever" and insert -- server --.

In the Claims

Column 17, Line 38, in Claim 1, delete "sever" and insert -- server --.

Column 18, Line 34, in Claim 9, delete "sever" and insert -- server --.

Column 19, Line 36, in Claim 17, delete "sever" and insert -- server --.

Signed and Sealed this
Tenth Day of May, 2022

Katherine Kelly Vidal
*Director of the United States Patent and Trademark Office*